(12) United States Patent
Weber

(10) Patent No.: US 12,365,089 B2
(45) Date of Patent: Jul. 22, 2025

(54) SYSTEM HAVING A SENSOR AND A METHOD FOR MONITORING A PLURALITY OF PROTECTED ZONES

(71) Applicant: SICK AG, Waldkirch (DE)

(72) Inventor: Michael Weber, Waldkirch (DE)

(73) Assignee: SICK AG, Waldkirch (DE)

( * ) Notice: Subject to any disclaimer, the term of this patent is extended or adjusted under 35 U.S.C. 154(b) by 140 days.

(21) Appl. No.: 18/514,237

(22) Filed: Nov. 20, 2023

(65) Prior Publication Data

US 2024/0198529 A1    Jun. 20, 2024

(30) Foreign Application Priority Data

Dec. 14, 2022  (DE) .......................... 102022133248.9

(51) Int. Cl.
*B25J 9/16*    (2006.01)
(52) U.S. Cl.
CPC ... *B25J 9/1676* (2013.01); *G05B 2219/39001* (2013.01); *G05B 2219/40339* (2013.01); *G05B 2219/50193* (2013.01)
(58) Field of Classification Search
USPC .................................................. 700/245–264
See application file for complete search history.

(56) References Cited

U.S. PATENT DOCUMENTS

| | | | | |
|---|---|---|---|---|
| 9,737,992 B2 * | 8/2017 | Mougin | .................. | B25J 9/1676 |
| 9,951,548 B2 * | 4/2018 | Oda | ........................ | E05F 15/40 |
| 11,285,611 B2 * | 3/2022 | Park | ........................ | B25J 13/003 |
| 11,882,964 B2 * | 1/2024 | Tanaka | ................. | A47J 37/1228 |
| 2004/0089793 A1 * | 5/2004 | Watanabe | ............... | F16P 3/144 |
| | | | | 250/221 |
| 2005/0238465 A1 * | 10/2005 | Razumov | ................... | G07F 7/00 |
| | | | | 414/273 |

(Continued)

FOREIGN PATENT DOCUMENTS

| | | |
|---|---|---|
| DE | 102007014612 A1 | 9/2008 |
| DE | 102013111570 A1 | 4/2015 |

(Continued)

OTHER PUBLICATIONS

German Search Report dated Aug. 21, 2023 corresponding to application No. 10 2022 133 248.9.

*Primary Examiner* — Jonathan L Sample
(74) *Attorney, Agent, or Firm* — Nath, Goldberg & Meyer; Jerald L. Meyer

(57) ABSTRACT

A method and a system have at least one sensor for monitoring a plurality of protected zones for infringement by at least one object. A controller controls a plant to be safeguarded having a mechanically movable part, having the sensor for the at least planar monitoring of the protected zones by a control and evaluation unit for evaluating. The received signals of the sensor determine which of the protected zones has been infringed by the object and which protected zone the object has left. The controller generates and outputs a switch signal that is a release signal for the release of the plant operation. The mechanically movable part is either in a first working zone or in a second working zone, with the first working zone and the second working zone each being associated with a first protected zone and a second protected zone, respectively.

8 Claims, 2 Drawing Sheets

(56) References Cited

U.S. PATENT DOCUMENTS

Figure 1:
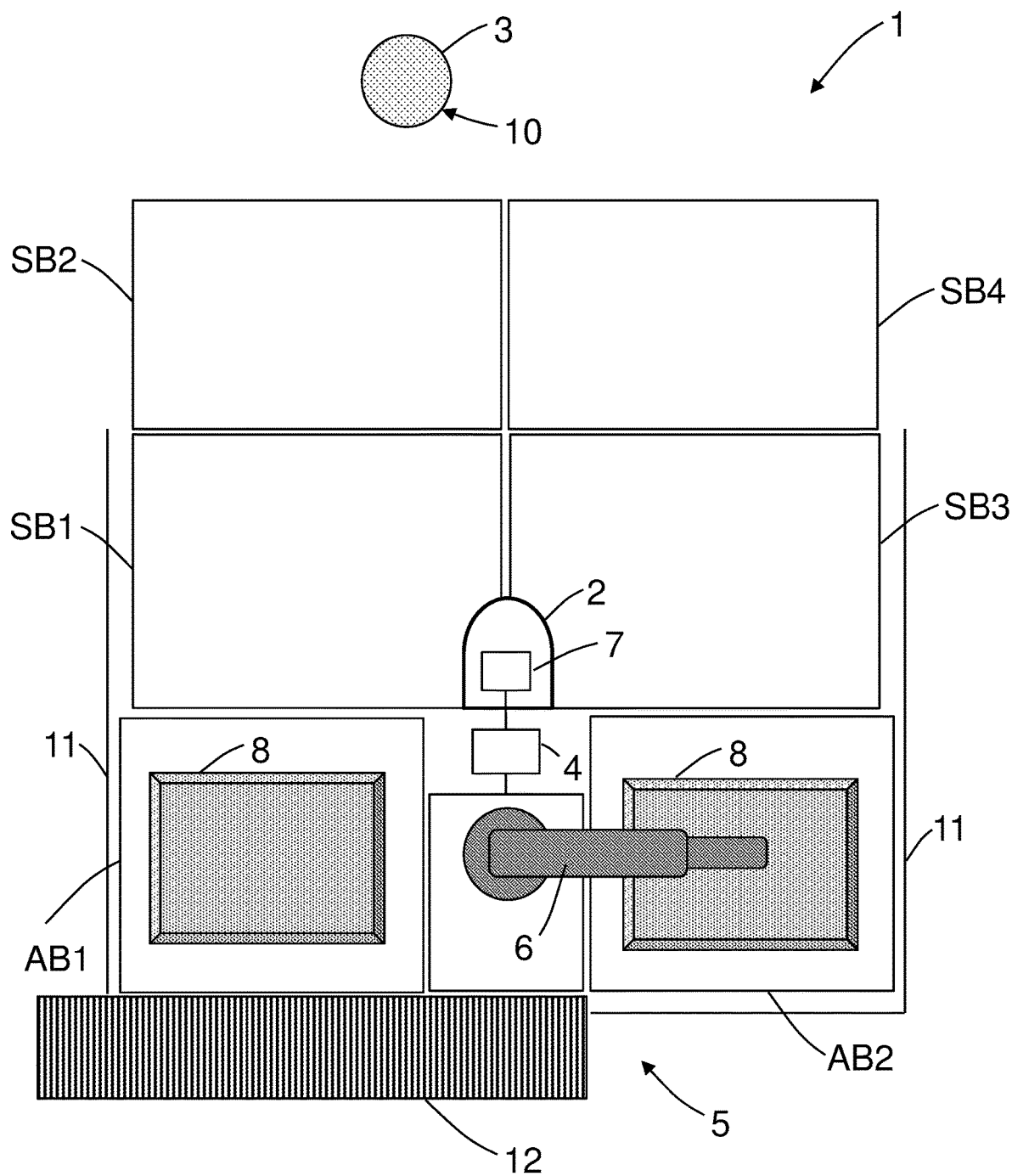

| | | | | |
|---|---|---|---|---|
| 2007/0192910 A1* | 8/2007 | Vu | ......................... | H04N 7/142 |
| | | | | 901/1 |
| 2011/0208355 A1* | 8/2011 | Tsusaka | ................... | B25J 13/08 |
| | | | | 901/31 |
| 2019/0359424 A1* | 11/2019 | Avraham | ................ | G06Q 10/08 |
| 2020/0171655 A1* | 6/2020 | Lin | ........................ | B25J 9/1612 |
| 2020/0223075 A1* | 7/2020 | Wagner | ..................... | B25J 19/06 |
| 2021/0260770 A1* | 8/2021 | Vu | ......................... | G01S 17/88 |
| 2021/0339396 A1* | 11/2021 | Denenberg | ............. | B25J 9/1697 |
| 2021/0394364 A1* | 12/2021 | Ogawa | .................... | B25J 9/1664 |
| 2022/0024039 A1* | 1/2022 | Chen | ....................... | G08B 21/22 |
| 2022/0379474 A1* | 12/2022 | Vu | ......................... | G01S 17/87 |

FOREIGN PATENT DOCUMENTS

| | | |
|---|---|---|
| DE | 202018103012 U1 | 7/2018 |
| DE | 102019111640 A1 | 12/2019 |
| EP | 3153885 B1 | 5/2018 |
| EP | 3248740 B1 | 7/2018 |
| EP | 1781981 B2 | 3/2022 |

\* cited by examiner

SYSTEM HAVING A SENSOR AND A METHOD FOR MONITORING A PLURALITY OF PROTECTED ZONES

The present invention relates to a system having a sensor for monitoring a plurality of protected zones for infringement by at least one object and to a method having a sensor for monitoring a plurality of protected zones for infringement by at least one object.

EP 3 153 885 B1 discloses optoelectronic protective equipment for the optical monitoring of a plurality of protected zones for infringement by at least one object and for controlling a plant to be safeguarded having a sensor to determine which of the protected zones has been infringed by the object, called a protected zone infringement in the following, and which protected zone the object has left, called a protected zone release in the following, having a controller to generate and output switch signal that is a release signal to release the plane operation, with the controller being configured only to output the release signal when the controller has recognized a predetermined order of incidents, with the incidents comprising protected zone infringements and protected zone releases of the protected zones and with each incident being either a protected zone infringement or a protected zone release.

DE 10 2019 111 640 A1 discloses a method of safeguarding at least one hazard site of a hazardous machine, with objects being detected in an environment of the hazard site from measured data of at least one 3D sensor and with a safety-related response of the machine taking place on an impending hazard, with a switchover being made to at least one new hazard site to be safeguarded during the operation of the machine, and with a check being made whether the new hazard site to be safeguarded is free of objects.

It is an object of the invention to provide an improved system for object detection that has higher availability.

The object is satisfied by a system having at least one sensor for monitoring a plurality of protected zones for infringement by at least one object and having a controller for controlling a plant to be safeguarded having a mechanically movable part, having the sensor for the at least planar monitoring of the protected zones, having a control and evaluation unit for evaluating the received signals of the sensor to determine which of the protected zones has been infringed by the object, called a protected zone infringement in the following, and which protected zone the object has left, called a protected zone release in the following, and having the controller to generate and output a switch signal that is a release signal to release the plant operation.

The controller is configured to output the release signal when the controller recognizes a predetermined order of incidents, with the incidents comprising protected zone infringements and protected zone releases of the protected zones and with each incident being either a protected zone infringement or a protected zone release.

The mechanically movable part has a first working zone and a second working zone, with the mechanically movable part being either in the first working zone or in the second working zone, with a first and second protected zone being associated with the first working zone and with the first protected zone being adjacent to the first working zone and the second protected hone being adjacent to the first protected zone, with the first protected zone only being reachable via the second protected zone, with a third and a fourth protected zone being associated with the second working zone, with the third protected zone being adjacent to the second working zone and the fourth protected zone being adjacent to the third protected zone, and with the third protected zone only being reachable via the fourth protected zone.

The controller is configured to start the movable part when an object has left the first protected zone and has then left the second protected zone, whereby a protected zone release is present in the first protected zone and subsequently in the second protected zone or an object has left the third protected zone and has then left the fourth protected zone, whereby a protected zone release is present in the third protected zone and subsequently in the fourth protected zone, with, if the mechanically movable part is active in the first working zone, on protected zone infringements in the fourth protected zone, the controller being configured to switch the mechanically movable part into a non-hazardous working mode and on protected zone infringements in the second protected zone, the controller being configured to stop the mechanically movable part, with, if the mechanically movable part is active in the second working zone, on unprotected zone infringements in the second protected zone, the controller being configured to switch the mechanically movable part into a non-hazardous working mode and on protected zone infringements in the fourth protected zone, the controller being configured to stop the mechanically movable part.

The object is further satisfied by a method having at least one sensor for monitoring a plurality of protected zones.

The mechanically movable part can, for example, be a driven mechanism, in particular a robot, a robot part, a movable machine part, or similar.

In the solution in accordance with the invention, the mechanically movable part is not stopped if processing material is collected or placed in the working zone in which the mechanically movable part is just not working. If the mechanically movable part is working in the first working zone, processing material can be collected or placed in the second working zone. If the mechanically movable part is working in the second working zone, processing material can be collected or placed in the first working zone. This provides the advantage of increased productivity.

For this purpose, the zone in front of the mechanically movable part, for example a loading robot having two loading stations is divided into two working ones, for example a right and a left working zone, or also a first and second working zone. Two protected fields are associated with each of the two working zones so that a total of four protected zones or protected fields are simultaneously monitored.

The protected fields can also be monitored by two or more sensors. In this respect, a single first sensor can, for example, monitor the first and second protected zones and a single second sensor can, for example, monitor the third and fourth protected zones. Provision can also be made that a single first sensor, for example, monitors the second and fourth protected zones and a single second sensor, for example, monitors the first and third protected zones.

A respective independent sequence monitoring in which the entry and exit order is monitored is implemented in the first and second protected zones and in the third and fourth protected zones.

An object or a person first has to enter the second protected zone and then enter the first protected zone to be able to reliably reach the first working zone. If the first protected zone is entered without the second protected zone previously having been entered, the mechanically movable part is stopped immediately.

Equally, an object or a person first has to enter the fourth protected zone and then enter the third protected zone to be able to reliably reach the second working zone. If the third protected zone is entered without the fourth protected zone previously having been entered, the mechanically movable part is stopped immediately.

An entry is recognized by the protected zones becoming free in the specified order.

A stop of the mechanically movable part is, however, not always initiated on a permitted entry into the first or third protected fields, that is on a described entry that has previously taken place, via the second and fourth protected fields. If, for example, the mechanically movable part is working in the second working zone, no stop of the mechanically movable part is initiated on a permitted entry into the first protected field since the person in the first protected zone is in a safe zone. The sequence monitoring is still active to recognize an entry.

Processing material can thus be collected or placed in the first working zone without stopping the mechanically movable part. To ensure safety when the person comes close to the mechanically movable part, the speed of the mechanically movable part is, for example, reduced or, for example, a switch is made into a collaborative operation on an interruption of the second protected zone.

Processing material can thus also be collected or placed in the second working zone without stopping the mechanically movable part. To ensure safety when the person comes close to the mechanically movable part, the speed of the mechanically movable part is, for example, reduced or, for example, a switch is made into a collaborative operation on an interruption of the fourth protected zone.

The advantage is that the mechanically movable part can still work productively and a person can simultaneously collect or place the other processing material. A manual reset or an automatic restart is not necessary.

The protected zones or protected fields can, for example, have any desired forms or can be configured with any desired forms. For example, parts of the protected zones or protected fields can have straight, curved, circular, and/or elliptical forms. The form of the protected zones is, for example, only limited by the angular and distance resolution of the sensor.

In a further development of the invention, the mechanically movable part is a mechanically movable part for loading pallets, with a respective pallet being present in the first working zone and/or in the second working zone.

In accordance with the further development, the mechanically movable part is not stopped if a pallet is collected or placed in the working zone in which the mechanically movable part is just not working. If the mechanically movable part is working in the first working zone, a pallet can be collected or placed in the second working zone. If the mechanically movable part is working in the second working zone, a pallet can be collected or placed in the first working zone. This provides the advantage of increased productivity on the automated loading of pallets.

In a further development of the invention, the controller is configured to generate the stop signal when a protected zone has been infringed and the predetermined order has not been run through.

An object or a person first has to enter the second protected zone and then enter the first protected zone to be able to reliably reach the first working zone. If the first protected zone is entered without the second protected zone previously having been entered, the mechanically movable part is stopped immediately.

Equally, an object or a person first has to enter the fourth protected zone and then enter the third protected zone to be able to reliably reach the second working zone. If the third protected zone is entered without the fourth protected zone previously having been entered, the mechanically movable part is stopped immediately.

In a further development of the invention, the controller has a timer so that the controller can monitor whether sequential incidents, that is protected zone infringements that follow on from one another or protected zone releases that follow on from one another take place within specific time windows. The timers are, for example, here coordinated with the movement speed of a person as an object.

In a further development of the invention, the sensor is a laser scanner. A laser scanner is an optoelectronic sensor, with the transmitter being a light transmitter and the receiver being a light receiver for a contactless scanning of the monitored zone having the protected zones by transmitting light beams into the monitored zone and detecting returning reflected light beams from objects within the monitored zone and evaluating the returning reflected light beams by the control and evaluation unit.

The laser scanner is, for example, a time of flight sensor, that is a laser scanner based on time of light evaluation, or a time of flight camera. The laser scanner is in particular a safety laser scanner or any kind of optoelectronic environmental detection sensor system.

A plurality of light transmitters and a plurality of light receivers are, for example, arranged, with the light transmitters and the light receivers being arranged in a common housing, with the light beams being transmitted by the light transmitters in fan shape in different angular directions and being received by the light receivers, with a partial protected field in the shape of a segment of a circle being formed by the light beams of a light transmitter and a received field of view of the light receiver, with the partial protected fields of neighboring reception elements being adjacent to one another and a plurality of partial protected fields forming a protected zone or a protected field.

The sensor thereby manages without mechanically movable parts. No rotating mirror or oscillating mirror is required. The sensor is thereby more robust with respect to oscillation/shock strains. The sensor without any mechanically movable arts is furthermore less expensive and has a higher service life.

In an alternative embodiment, the laser scanner has a scanning unit that is rotatable about an axis of rotation and that has at least one scanning module for the scanning of the monitored zone in the course of the rotation of the scanning unit about the axis of rotation and for the generation of corresponding received signals and has the control and evaluation unit for the acquisition of information on the objects from the received signals, with the scanning module comprising at least the light transmitter for the transmission of a light beam or of a plurality of mutually separate light beams, and has at least the light receiver for the generation of the received signals from the light beams remitted from the objects.

In accordance with the alternative embodiment, only a single light transmitter and only a single light receiver are required to generate the planar protected zones since the light transmitter and the light receiver continuously detect the environment at different angles via the rotatable scanning unit.

In a further development of the invention, the sensor is a 3D camera for the three-dimensional detection of the protected zones.

The optoelectronic sensor is, for example, configured to detect objects in a three-dimensional monitored zone having at least one image sensor that can record a pixel image of the monitored zone by means of a plurality of light reception elements and having at least the control and evaluation unit that is configured for the detection of an object from image data of the pixel image, with a plurality of image sensors being provided that each have at least one pixel row having light reception elements, and with the image sensors being arranged spaced apart from one another so that every image sensor can record its own plane of the monitored zone, with the image sensors being arranged such that the planes are free of overlap with respect to one another and are substantially in parallel with one another or spread apart from one another in fan shape starting from the image sensors.

The further development starts, for example, from the idea of expanding inexpensive area sensors. The monitoring of a three-dimensional spatial zone is also made possible by a duplication and suitable arrangement of such sensors.

In a further development of the invention, the sensor is a radar sensor.

in accordance with the further development, the sensor is a radar sensor, with the transmitter being a radar transmitter and the receiver being a radar receiver for a contactless scanning of the monitored zone by transmitting radio waves into the monitored zone and detecting returning reflected radio waves from objects within the monitored zone and evaluating the returning reflected the radio waves by the control and evaluation unit.

The radar sensor or a radar device has the radar transmitter and the radar receiver to transmit a radar signal into the monitored zone and to receive it from there again. The radar transmitter and the radar receiver are preferably formed together as a transceiver. The control and evaluation unit evaluates the received signal of the radar receiver to determine object properties. A distance is preferably measured from the signal time of flight of the radar signal here. Other exemplary object properties include the speed or the simple determination of the presence or absence of objects in the first monitored zone.

The monitoring by radar is known and is used in a number of application fields. Different principles are known here to measure the distance from a detected object, for example impulse radar, continuous wave radar, or frequency modulated continuous wave (FMCW) radar. The direct measurement of a speed using the Doppler effect is also a typical radar application.

Radar penetrates a number of materials and is therefore relatively robust. This also applies to weather effects such as fog, rain, or snow in the external region.

Figure 2:
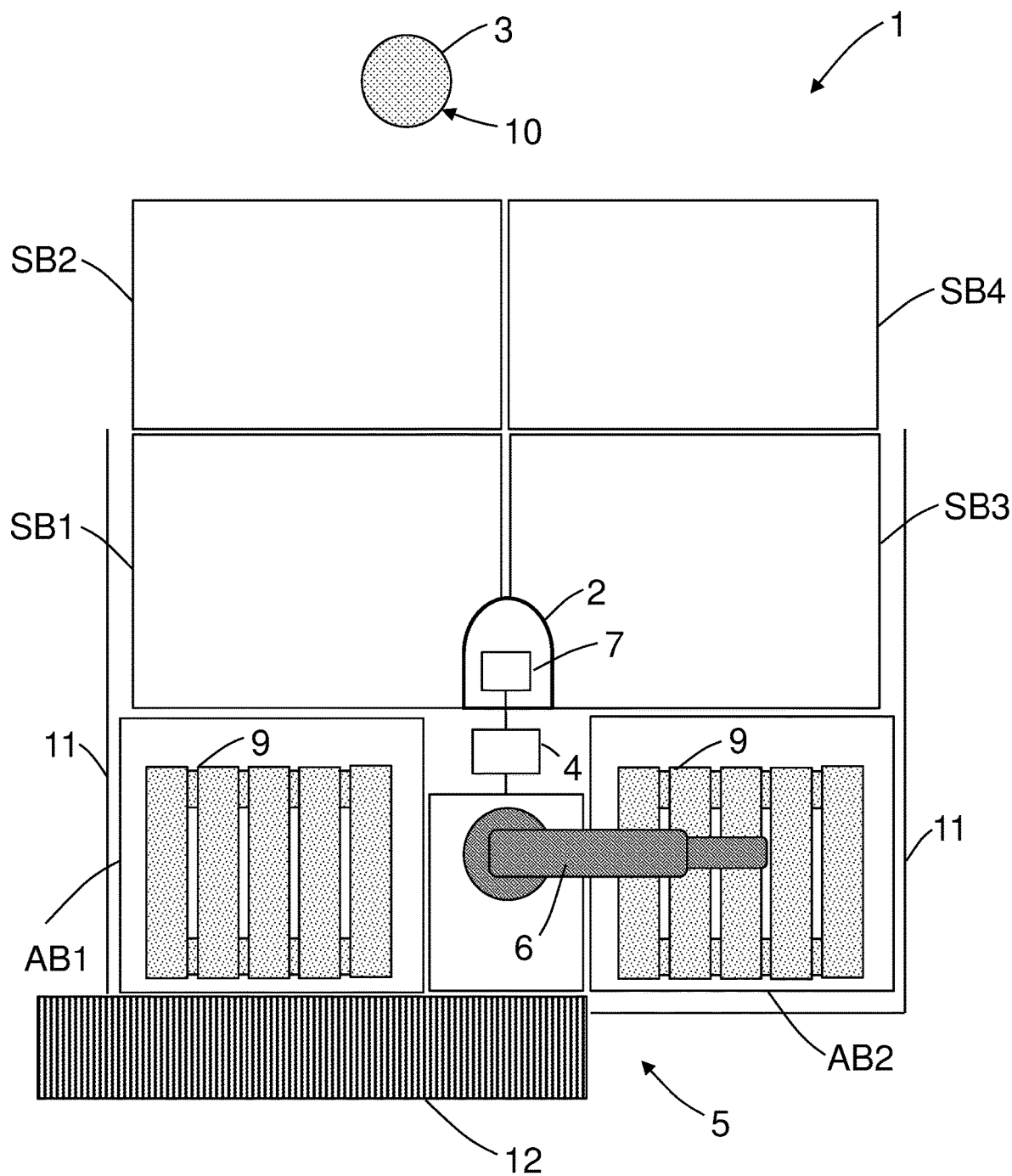

The invention will also be explained in the following with respect to further advantages and features with reference to the enclosed drawing and embodiments. The Figures of the drawing show in:

FIGS. 1 and 2 respectively, a system having at least one sensor for monitoring a plurality of protected zones.

In the following Figures, identical parts are provided with identical reference numerals.

FIG. 1 shows a system 1 having at least one sensor 2 for monitoring a plurality of protected zones SB1, SB2, SB3, SB4 for infringement by at least one object 3 and having a controller 4 for controlling a plant 5 to be safeguarded having a mechanically movable part 6, for example a robot 6, having the sensor 2 for the at least planar monitoring of the protected zones SB1, SB2, SB3, SB4, having a control and evaluation unit 7 for evaluating the received signals of the sensor 2 to determine which of the protected zones SB1, SB2, SB3, SB4 has been infringed by the object 3, called a protected zone infringement in the following, and which protected zone the object 3 has left, called a protected zone release in the following, and having the controller 4 to generate and output a switch signal that is a release signal to release the plant operation.

The mechanically movable part 6 can, for example, be a driven mechanism, in particular a robot 6, a robot part, a movable machine part, or similar. An application using a robot 6 will be described in the following.

The controller 4 is configured to output the release signal when the controller 4 recognizes a predetermined order of incidents, with the incidents comprising protected zone infringements and protected zone releases of the protected zones SB1, SB2, SB3, SB4 and with each incident being either a protected zone infringement or a protected zone release.

The robot 6 has at least one working zone AB1 and one second working zone AB2, with the robot 6 being either in the first working zone AB1 or in the second working zone AB2, with a first protected zone SB1 and a second protected zone SB2 being associated with the first working zone AB1 and with the first protected zone SB1 being adjacent to the first working zone AB1 and the second protected zone SB2 being adjacent to the first protected zone SB1, with the first protected zone SB1 only being reachable via the second protected zone SB2, with a third protected zone SB3 and a fourth protected zone SB4 being associated with the second working zone AB2, with the third protected zone SB3 being adjacent to the second working zone AB2 and the fourth protected zone SB4 being adjacent to the third protected zone SB3, and with the third protected zone SB3 only being reachable via the fourth protected zone SB4.

The first working zone AB1, the second working zone AB2, the first protected zone SB, and the third protected zone SB3 are laterally safeguarded from entry by a barrier 11. The barrier 11 can be a fence or similar.

A conveying device 12 is furthermore provided to supply material or goods to the robot. The conveying device can, for example, be a conveyor belt or similar.

The controller 4 is configured to start the robot 6 when an object 3 has left the first protected zone SB1 and has then left the second protected zone SB2, whereby a protected zone release is present in the first protected zone SB1 and subsequently in the second protected zone SB2 or an object 3 has left the third protected zone SB3 and subsequently the fourth protected zone SB4, whereby a protected zone release is present in the third protected zone SB3 and subsequently in the fourth protected zone SB4, with, if the robot 6 is active in the first working zone AB1, on protected zone infringements in the fourth protected zone SB4, the controller 4 being configured to switch the robot into a non-hazardous working mode and on protected zone infringements in the second protected zone SB2, the controller 4 being configured to stop the robot 6, with, if the robot 6 is active in the second working zone SB2, on protected zone infringements in the second protected zone SB2, the controller 4 being configured to switch the robot 6 into a non-hazardous working mode and on protected zone infringements in the fourth protected zone SB4, the controller 4 being configured to stop the robot 6.

The robot 6 is not stopped when processing material 8 is collected or placed in the working zone in which the robot 6 is just not working. If the robot 6 is working in the first working zone AB1, processing material 8 can be collected or placed in the second working zone AB2. If the robot 6 is working in the second working zone AB2, processing material 8 can be collected or placed in the first working zone AB1. This provides the advantage of increased productivity.

For this purpose, the zone in front of the robot 6, for example a loading robot having two loading stations is divided into two working zones AB1, AB2, for example a left and a right working zone, or also a first working zone AB1 and a second working zone AB2. Two protected fields SB1, SB2, SB3, SB4 are associated with each of the two working zones AB1, AB2 so that a total of four protected zones SB1, SB2, SB3, SB4 or four protected fields are simultaneously monitored A respective independent sequence monitoring in which the entry and exit order is monitored is implemented in the first protected zone SB1 and in the second protected SB1 and in the third protected zone SB3 and in the fourth protected zone SB4.

An object 3 or a person 10 first has to enter the second protected zone SB2 and then enter the first protected zone SB1 to be able to reliably reach the first working zone AB1. If the first protected zone SB1 is entered without the second protected zone SB2 previously having been entered, the robot 6 is stopped immediately.

Equally, an object 3 or a person 10 first has to enter the fourth protected zone SB4 and then enter the third protected zone SB3 to be able to reliably reach the second working zone AB2. If the third protected SB3 zone is entered without the fourth protected zone SB4 previously having been entered, the robot 6 is stopped immediately.

An entry is thus recognized in which a person 10 could directly enter into the hazard zone, that is the first working zone AB1 or the second working zone AB2.

A stop of the robot 6 is, however, not always initiated on a permitted entry into the first protected zone SB1 or third protected zone SB3, that is on a described entry that has previously taken place, via the second protected zone SB2 and the fourth protected zone SB4. If, for example, the robot 6 is working in the second working zone AB2, no stop of the robot 6 is initiated on a permitted entry into the first protected zone SB1 since the person 10 in the first protected zone SB1 is in a safe zone. The sequence monitoring is still active to recognize an entry.

Processing material can thus be collected or placed in the first working zone SB1 without stopping the robot 6. To ensure safety when the person 10 comes close to the robot 6, the speed of the robot 6 is, for example, reduced or, for example, a switch is made into a collaborative operation on an interruption of the second protected zone SB2.

Processing material can thus also be collected or placed in the second working zone AB2 without stopping the robot 6. To ensure safety when the person 10 comes close to the robot 6, the speed of the robot 6 is, for example, reduced or, for example, a switch is made into a collaborative operation on an interruption of the fourth protected zone SB4.

The advantage is that the robot 6 can still work productively and a person 10 can simultaneously collect or place the other processing material 8.

The protected zones SB1, SB2, SB3, SB4 or protected fields can, for example, have any desired forms or can be configured with any desired forms. For example, parts of the protected zones SB1, SB2, SB3, SB4 or protected fields can have straight, curved, circular, and/or elliptical forms.

In accordance with FIG. 2, the robot 6 is a robot 6 for loading pallets 9, with a respective pallet 9 being present in the first working zone AB1 and/or in the second working zone AB2.

In accordance with the further development, the robot 6 is not stopped when a pallet 9 is collected or placed in the working zone in which the robot is just not working. If the robot is working in the first working zone AB1, a pallet 9 can be collected or placed in the second working zone AB2. If the robot 6 is working in the second working zone AB2, a pallet 9 can be collected or placed in the first working zone. This provides the advantage of increased productivity on the automated loading of pallets 9.

The controller 4 is, for example, configured to generate the stop signal when a protected zone SB1, SB2, SB3, SB4 has been infringed and the predetermined order has not been run through.

For example, the controller 4 has a timer so that the controller 4 can monitor whether sequential incidents, that is protected zone infringements that follow on from one another or protected zone releases that follow on from one another, take place within specific time windows. The timers are, for example, here coordinated with the movement speed of a person 10 as an object 3.

The sensor 2 is a laser scanner, for example. A laser scanner is an optoelectronic sensor, with the transmitter being a light transmitter and the receiver being a light receiver for a contactless scanning of the monitored zone having the protected zones SB1, SB2, SB3, SB4 by transmitting light beams into the monitored zone and detecting returning reflected light beams from objects 3 within the monitored zone and evaluating the returning reflected light beams by the control and evaluation unit. 7

The laser scanner is, for example, a time of flight sensor, that is a laser scanner based on time of light evaluation, or a time of flight camera. The laser scanner is in particular a safety laser scanner.

The sensor is, for example, a 3D camera for the three-dimensional detection of the protected zones SB1, SB2, SB3, SB4. The sensor is a radar sensor, for example.

REFERENCE NUMERALS 1 system
2 sensor
SB1 first protected zone
SB2 second protected zone
SB3 third protected zone
SB4 fourth protected zone
3 object
4 controller
5 plant
6 mechanically movable part or robot
7 control and evaluation unit
AB1 first working zone
AB2 second working zone
8 processing material
9 pallet
10 person
11 barrier
12 conveying device

The invention claimed is:

1. A system having at least one sensor for monitoring a plurality of protected zones for infringement by at least one object and having a controller for controlling a plant to be safeguarded having a mechanically movable part,
   having the sensor for the at least planar monitoring of the protected zones,
   having a control and evaluation unit for evaluating the received signals of the sensor to determine which of the protected zones has been infringed by the object, called a protected zone infringement in the following, and which protected zone the object has left, called a protected zone release in the following, having the controller to generate and output a switch signal that is a release signal for the release of the plant operation, with the controller being configured to output the release signal when the controller recognizes a predefined order of incidents, with the incidents comprising protected zone infringements and protected zone releases of the protected zones and with each incident being either a protected zone infringement or a protected zone release, with the mechanically movable part having a first working zone and a second working zone, with the mechanically movable part being either in the first working zone or in the second working zone, with a first protected zone and a second protected zone being associated with the first working zone, with the first protected zone being adjacent to the first working zone and the second protected zone being adjacent to the first protected zone, with the first protected zone only being reachable via the second protected zone, with a third protected zone and a fourth protected zone being associated with the second working zone, with the third protected zone being adjacent to the second working zone and the fourth protected zone being adjacent to the third protected zone, with the third protected zone only being reachable via the fourth protected zone, with the controller being configured to start the mechanically movable part when an object has left the first protected zone and has then left the second protected zone, whereby a protected zone release is present in the first protected zone and subsequently in the second protected zone, or an object has left the third protected zone and has then left the fourth protected zone, whereby a protected zone release is present in the third protected zone and subsequently in the fourth protected zone, with, if the mechanically movable part is active in the first working zone, on protected zone infringements in the fourth protected zone being configured to switch the mechanically movable part into a non-hazardous working mode, and, on protected zone infringements in the second protected zone, the controller being configured to stop the mechanically movable part, with, if the mechanically movable part is active in the second working zone, on protected zone infringements in the second protected zone, the controller being configured to switch the mechanically movable part into a non-hazardous working mode, and, on protected zone infringements in the fourth protected zone, the controller being configured to stop the mechanically movable part.

2. The system in accordance with claim 1, wherein the mechanically movable part is a mechanically movable part for loading pallets(9), with a respective pallet being present in the first working zone and/or in the second working zone.

3. The system in accordance with claim 1, wherein the controller is configured to generate the stop signal when a protected zone has been infringed and the predefined order was not followed.

4. The system accordance with claim 1, wherein the controller has a timer so that the controller can monitor whether incidents following one another take place within specific time windows.

5. The system in accordance with claim 1, wherein the sensor is a laser scanner.

6. The system in accordance with claim 1, wherein the sensor is a 3D camera for the three-dimensional detection of the protected zones.

7. The system in accordance with claim 1, wherein the sensor is a radar sensor.

8. A method having at least one sensor for monitoring a plurality of protected zones for infringement by at least one object and having a controller for controlling a plant to be safeguarded having a mechanically movable part, having the sensor for the at least planar monitoring of the protected zones, having a control and evaluation unit for evaluating the received signals of the sensor to determine which of the protected zones has been infringed by the object, called a protected zone infringement in the following, and which protected zone the object has left, called a protected zone release in the following, having the controller to generate and output a switch signal that is a release signal for the release of the plant operation, with the controller being configured to output the release signal when the controller recognizes a predefined order of incidents, with the incidents comprising protected zone infringements and protected zone releases of the protected zones and with each incident being either a protected zone infringement or a protected zone release, with the mechanically movable part having a first working zone and a second working zone, with the mechanically movable part being either in the first working zone or in the second working zone, with a first protected zone and a second protected zone being associated with the first working zone, with the first protected zone being adjacent to the first working zone and the second protected zone being adjacent to the first protected zone, with the first protected zone only being reachable via the second protected zone, with a third protected zone and a fourth protected zone being associated with the second working zone, with the third protected zone being adjacent to the second working zone and the fourth protected zone being adjacent to the third protected zone, with the third protected zone only being reachable via the fourth protected zone, with the mechanically movable part being started when an object has left the first protected zone and has then left the second protected zone, whereby a protected zone release is present in the first protected zone and subsequently in the second protected zone, or an object has left the third protected zone and has then left the fourth protected zone, whereby a protected zone release is present in the third protected zone and subsequently in the fourth protected zone, with, if the mechanically movable part is active in the first working zone, on protected zone infringements in the fourth protected zone being switched into a non-hazardous working mode by the controller, and, on protected zone infringements in the second protected zone, the mechanically movable part being stopped by the controller,
with, if the mechanically movable part is active in the second working zone, on protected zone infringements in the second protected zone being switched into a non-hazardous working mode by the controller,
and, on protected zone infringements in the fourth protected zone, the mechanically movable part being stopped by the controller.

\* \* \* \* \*